(12) United States Patent
Park

(10) Patent No.: US 10,412,144 B2
(45) Date of Patent: Sep. 10, 2019

(54) TRANSMITTER AND RECEIVER FOR REMOTE CONTROL SUPPORT, OPERATION METHOD THEREOF AND REMOTE CONTROL SYSTEM

(71) Applicant: N3N CO., LTD., Seoul (KR)

(72) Inventor: Bum Jin Park, Hanam-si (KR)

(73) Assignee: N3N CO., LTD., Seoul (KR)

( * ) Notice: Subject to any disclaimer, the term of this patent is extended or adjusted under 35 U.S.C. 154(b) by 2 days.

(21) Appl. No.: 15/818,755

(22) Filed: Nov. 21, 2017

(65) Prior Publication Data

US 2018/0146023 A1 May 24, 2018

(30) Foreign Application Priority Data

Nov. 21, 2016 (KR) ........................ 10-2016-0155124

(51) Int. Cl.
*H04L 29/06* (2006.01)
*H04B 1/02* (2006.01)
*H04W 84/12* (2009.01)

(52) U.S. Cl.
CPC ............ *H04L 65/607* (2013.01); *H04B 1/02* (2013.01); *H04L 65/4092* (2013.01); *H04L 65/60* (2013.01); *H04L 65/80* (2013.01); *H04W 84/12* (2013.01)

(58) Field of Classification Search
CPC ... H04L 65/607; H04L 65/60; H04L 65/4092; H04B 1/02; H04W 84/12
USPC ....................... 375/295, 214, 316
See application file for complete search history.

(56) References Cited

U.S. PATENT DOCUMENTS

| 7,505,480 | B1* | 3/2009 | Zhang | H04M 11/062 370/235 |
| 2006/0098745 | A1* | 5/2006 | Chou | H04L 1/20 375/259 |
| 2010/0164981 | A1* | 7/2010 | Lu | G09G 5/02 345/604 |
| 2012/0106669 | A1* | 5/2012 | Rao | H04N 19/172 375/295 |
| 2013/0287311 | A1* | 10/2013 | Furihata | G06T 9/00 382/233 |
| 2014/0315247 | A1* | 10/2014 | Kesik-Brodacka | C12N 15/70 435/69.1 |
| 2015/0288919 | A1* | 10/2015 | Labosco | H04N 19/44 348/445 |
| 2016/0057432 | A1* | 2/2016 | Shibayama | H04N 19/117 375/240.03 |

(Continued)

FOREIGN PATENT DOCUMENTS

JP 2010128512 A 6/2010
KR 1020050099830 A 10/2005

(Continued)

*Primary Examiner* — Emmanuel Bayard
(74) *Attorney, Agent, or Firm* — Envision USA Inc.

(57) ABSTRACT

Provided are a transmitter and receiver for remote control support, an operation method thereof and a remote control system. The transmitter connected to a source device includes a first reception unit for receiving display screen data of the source device, an encoder for encoding the display screen data received at the first reception unit, and a first transmission unit for transmitting the encoded data to a receiver using a real-time communication protocol, Here, the transmitter is a hardware device wired to the source device through a digital interface.

19 Claims, 16 Drawing Sheets

(56) References Cited

U.S. PATENT DOCUMENTS

2018/0103230 A1* 4/2018 Vitta .................. H04N 19/59

FOREIGN PATENT DOCUMENTS

| KR | 1020070043388 A | 4/2007 |
| KR | 1020090121014 A | 11/2009 |
| KR | 1020120128373 A1 | 11/2012 |

* cited by examiner

TRANSMITTER AND RECEIVER FOR REMOTE CONTROL SUPPORT, OPERATION METHOD THEREOF AND REMOTE CONTROL SYSTEM

CROSS-REFERENCE TO RELATED APPLICATIONS

This U.S. non-provisional patent application claims priority under 35 U.S.C. § 119 of Korean Patent Application No. 10-2016-0155124, filed on Nov. 21, 2016, the entire contents of which are hereby incorporated by reference.

This application is one of the results of Advanced Technology Center Association (ATC) project (Project No. 10052464 (2017.06-2019.05.31), Project Name: Multi-Dimensional Visualization Technique Research for analyzing IoT big data) hosted by Ministry Of Trade, Industry and Energy (MOTIE) and Korea Evaluation Institute of Industrial Technology (KEIT) in Republic of Korea.

BACKGROUND OF THE INVENTION

Field of the Invention

The present invention disclosed herein relates to a remote control apparatus and system, and more particularly, to an apparatus and system for supporting efficient control of the apparatus at a remote place.

Related Art

Recently, many programs that remotely control a target device (also, referred to as a source device) via a smartphone or a PC distant from a remote place are being released. Accordingly, a user can control the target device at a remote place even if not located at the front of the source device.

However, such a remote control method has a limitation in that a remote control program of a software type needs to be installed in a source device and a smart phone or a PC located at a remote place, respectively. Also, the source device operating through such a software-type remote control program needs to encode a display screen which may be of high-quality image while performing other tasks, thereby imposing a considerable burden on the device itself. Also, since the device has to operate according to a remote control command while transmitting data to a remote smartphone or PC as well as encoding, there is a limitation in that the processing speed suddenly slows down or the device arbitrarily stops.

SUMMARY OF THE INVENTION

The present invention provides a hardware type transmitter and receiver for remote control support, an operation method thereof and a remote control system, which can receive display screen data of a source device, and reduce a load of a remote control operation of the source device through encoding and mixing.

Embodiments of the present invention provide transmitters (Tx) for remote control support, connected to a source device, the transmitter comprising: a first reception unit for receiving display screen data of the source device; an encoder for encoding the display screen data received at the first reception unit; and a first transmission unit for transmitting the encoded data to a receiver using a real-time communication protocol, wherein the transmitter is a hardware device wired to the source device through a digital interface.

In some embodiments, the transmitter may further include: a second reception unit for receiving a control command received from the receiver; and a command providing unit for parsing the control command received at the second reception unit and providing the control command to the source device.

In other embodiments, the transmitter may further include: a first conversion unit for converting the display screen data into YUV data; and a second conversion unit for converting the YUV data into RGB data.

In still other embodiments, the second conversion unit may generate a plurality of converted data through a plurality of channels and may provide the converted data to the encoder and a mixer, and the mixer may perform mixing to display the converted data on a first display unit by bypassing through the digital interface.

In even other embodiments, the receiver may include a mobile terminal located around the transmitter, and the transmitter may transmit the encoded data to the mobile terminal through a wireless local area network.

In yet other embodiments, the mobile terminal may receive first encoded image data from the first transmission unit of the transmitter and second encoded image data from another transmitter, and may combine and display the first and second encoded image data on a single screen of the mobile terminal.

In further embodiments, the transmitter may have at least one of a unique IP address, a netmask, a gateway address, and a MAC address, and may arbitrarily change at least a portion of the address information through a user interface.

In still further embodiments, the encoder may consider at least one of a resolution, a codec type, a frame rate and a bit rate as encoding factors of the display screen data, and may arbitrarily change at least a portion of the encoding factors through a user interface.

In even further embodiments, the transmitter may include a function of a receiver for receiving and decoding encoded data from another transmitter and providing the decoded data to a display unit, and may arbitrarily switch an operation mode between a transmitter and a receiver through a user interface.

In yet further embodiments, when encoding the display screen data, the transmitter may encode an image having a motion amount larger than a reference value in a first mode and may encode an image having a motion amount smaller than the reference value in a second mode.

In much further embodiments, a current network load may be analyzed in real-time, and the encoding of the display screen data may be performed in a third mode when the network load is higher than a reference value and in a fourth mode when the network load is lower than the reference value.

In still much further embodiments, when the source device provides an event signal to the transmitter, the transmitter may store display screen data at time points before and after the event signal is provided.

In even much further embodiments, display screen data stored in response to a request from the receiver for display screen data at the time points before and after the event signal is provided may be provided to the receiver.

In other embodiments of the present invention, operation methods of a transmitter (Tx) for remote control support, connected to a source device include: receiving display screen data of the source device; encoding the received display screen data; and transmitting the encoded data to a receiver using a real-time communication protocol, wherein the transmitter is a hardware device wired to the source device through a digital interface.

In still other embodiments of the present invention, receivers (Rx) for remote control support includes: a third reception unit for receiving, from a transmitter (Tx) connected to a source device, encoded data generated by encoding display screen data of the source device using a real-time communication protocol; a decoder for decoding the encoded data received at the third reception unit; and a mixer for performing mixing to provide the decoded data to a second display unit.

In some embodiments, the receiver may further include: a control command input unit for receiving a control command for remotely controlling the source device through a user interface; and a second transmission unit for transmitting the control command to the transmitter.

In other embodiments, the receiver may further include a third conversion unit for converting the decoded YUV data into RGB data.

In still other embodiments, the receiver may manage a list of at least one connectable transmitter, and may select at least one of the at least one transmitter included in the list through a user interface and receive display screen data from the selected transmitter.

In even other embodiments of the present invention, operation methods of a receiver (Rx) for remote control support include: receiving, from a transmitter (Tx) connected to a source device, encoded data generated by encoding display screen data of the source device using a real-time communication protocol; decoding the received encoded data received; and performing mixing to provide the decoded data to a second display unit.

In yet other embodiments of the present invention, systems for remote control support, connected to a source device includes: a transmitter (Tx) receiving display screen data of the source device, encoding the received display screen data, and transmitting the encoded data to a receiver using a real-time communication protocol; and a receiver (Rx) receiving, from the transmitter, the encoded data using the real-time communication protocol, decoding the received encoded data, and performing mixing to provide the decoded data to a connected display unit, wherein the transmitter is a hardware device wired to the source device through a digital interface, and the receiver and the transmitter are located at places distant from each other.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
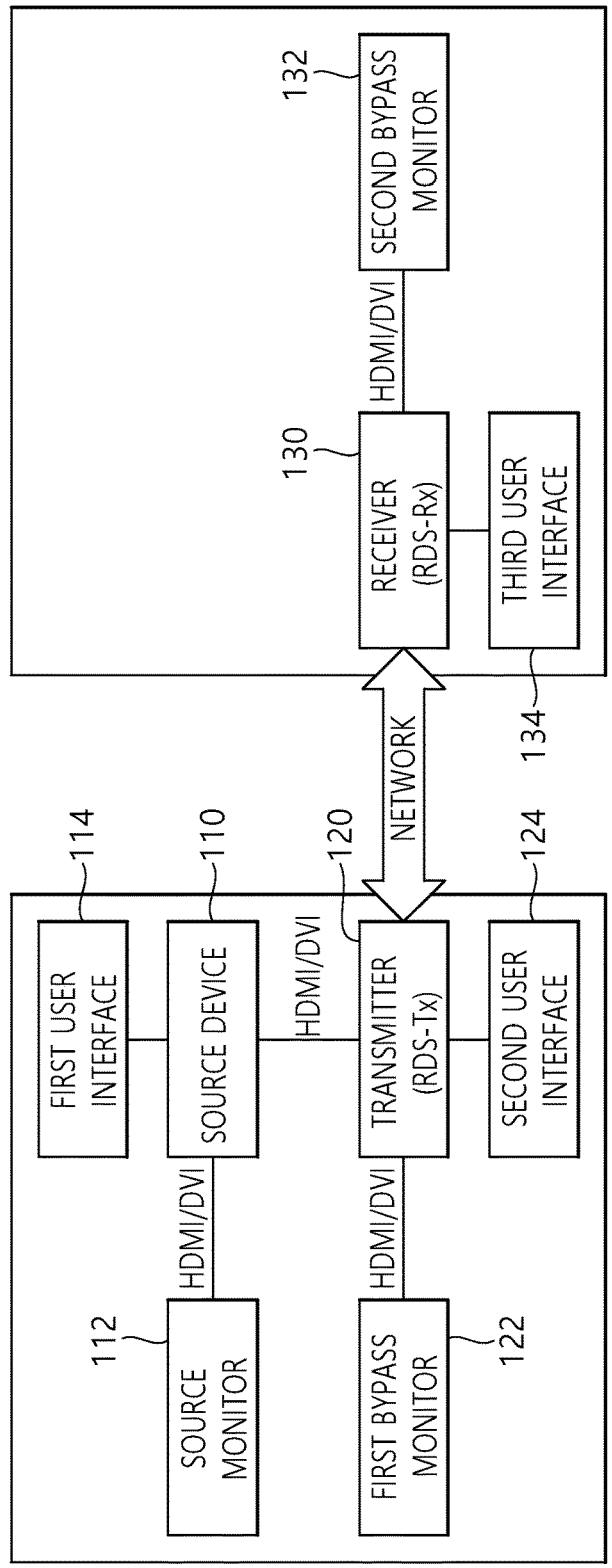
FIG. 1 is a schematic view illustrating a system including a transmitter and a receiver for remote control support according to an embodiment of the present invention.

Since the present invention can be modified into various types and can be implemented into various embodiments, specific embodiments will be illustrated in the drawings and described in this disclosure in detail.

However, the present invention is not limited to a specific implementation type, but should be construed as including all modifications, equivalents, and substitutes involved in the spirit and the technical scope of the present invention.

The terms such as "a first/the first" and "a second/the second" may be used to describe various components, but the components should not be limited by the terms. The terms are used only in order to distinguish one component from another component. For example, a first component may be named a second component without deviating from the scope of the present invention, and similarly, the second component may be named the first component. The term "and/or" encompasses a combination of a plurality of related items or any one of a plurality of related items.

It should be understood that when an element is referred to as being "connected" or "coupled" to another element, it may be directly connected or coupled to the other element but another element may also be interposed therebetween.

On the other hand, when an element is referred to as being "directly connected" or "directly coupled" to another element, it should be understood that there are no other elements in between.

The terms used herein are used only to describe specific embodiments, and are not intended to limit the present invention. The singular forms "a," "an," and "the" include plural referents unless the context clearly dictates otherwise. In this disclosure, the terms "include," "comprise," or "have" specify features, numbers, steps, operations, elements or combinations thereof, but do not exclude existence or addition possibility of one or more other features, numbers, steps, operations, elements or combinations thereof.

Unless described otherwise, all terms used herein including technical or scientific terms may include the same meaning as those generally understood by persons skilled in the art to which the present invention belongs. Terms as defined in dictionaries generally used should be construed as including meanings which accord with the contextual meanings of related technology. Also, unless clearly defined in this disclosure, the terms should not be construed as having ideal or excessively formal meanings.

Hereinafter, exemplary embodiments of the present invention will be described in detail with reference to the accompanying drawings. In order to help the overall understanding of the present disclosure, the same reference numerals will be used for the same elements in the drawings, and a duplicate description of the same elements will be omitted.

Remote Control System

FIG. 1 is a schematic view illustrating a system including a transmitter and a receiver for remote control support according to an embodiment of the present invention. As shown in FIG. 1, a system for remote control support according to an embodiment of the present invention may include a source device 110, a transmitter (RDS-Tx) 120, and a receiver (RDS-Rx) 130.

Referring to FIG. 1, the source device 110 may be a device that is subject to remote control. The source device 110 may include a Personal Digital Assistant (PDA), a Personal Computer (PC), a laptop, a smart phone, a wireless sensor, a mobile terminal, and Consumer Electronics (CE).

The source device 110 may be connected to a source monitor 112 to display a display screen. The connection with the source monitor 112 may be implemented through a digital interface such as a High-Definition Multimedia Interface (HDMI) or a Digital Visual Interface (DVI).

The source device 110 may be connected to a first user interface 114, and may be controlled by receiving a user input from the first user interface 114.

The relationship between the source monitor 112 and the source device 110 and the relationship between the first user interface 114 and the source device 110 may be considered to be the same as the relationship between a computer main body and a monitor and the relationship between the computer main body and a keyboard/mouse.

When the transmitter 120 is connected to the source device 110 via a digital interface, the source device 110 may recognize the connection with the transmitter 120, and display screen data of the source device 110 may be transmitted to the transmitter 120 in real-time. In this case, the source device 110 needs to be equipped with a driver associated with the transmitter 120 such that the transmitter 120 is recognized by the source device 110.

The source device 110 may receive a control command from a user of the receiver 130 spaced away through the transmitter 120, and may be controlled in accordance with the control command inputted by a user into the receiver 130.

According to an embodiment of the present invention, the source device 110 may perform a function of managing a plurality of peripherals as a server device. Here, the peripherals may include Internet of Things (IoT)-based devices or sensors (not shown) which collect various kinds of sensing information. That is, the source device 110 may be a device that controls the system based on data collected through the IoT sensors, and the sensing information collected thereby may be monitored by a remote user through the remote control transmitter 120 and the receiver 130. Also, the source device 110 may be remotely controlled via a third user interface 134 connected to the receiver 130. As the source device 110 is controlled by a remote user through the third user interface 134, the IoT sensors connected to the source device 110 may also be remotely controlled.

The transmitter 120 is a hardware device that is hard-wired to the source device 110 via a digital interface (including HDMI/DVI). The transmitter 120 may include an encoding function, a network function, and a computer command interpretation function. The transmitter 120 receives the display screen information (which may be a video stream) of the source device 110 from the source device 110 that is hard-wired via the digital interface. Then, the transmitter 120 encodes the received display screen information in real-time and provides the encoded information to the receiver 130 through a network. In this case, the encoded data is provided to the receiver 130 through a real-time communication protocol (RTP or RTSP) such that a user of the receiver 130 may view the data and immediately issue a control command at a remote site.

The transmitter 120 provides the screen encoded by itself to a first bypass monitor 122 such that a user of the transmitter 120 can confirm the display information transmitted through the transmitter 120. Also, the encoding, network and/or system setting screen of the transmitter 120 may be provided to the first bypass monitor 122 such that a user of the transmitter 120 can change the setting information of the transmitter 120 through a second user interface 124 connected with the transmitter 120.

Also, the transmitter 120 may receive control commands for the source device 110 from the receiver 130 through the network. It is also desirable that the reception of the control commands is performed through a real-time communication protocol. The transmitter 120 may parse the received control command to provide the parsed control command to the source device 110. The source device 110 may receive the parsed control command, and thus may be remotely controlled.

The receiver 130 receives in real-time the encoded data related to the display image of the source device 110 from the transmitter 120 through the network, and displays a decoded image on a second bypass monitor 132 through decoding. In this case, the receiver 130 and the second bypass monitor 132 may also be connected to each other through a digital interface (HDMI/DVI). A user of the receiver 130 may check the display image of the source device 110 in real-time decoded by looking at the second bypass monitor 132, and can remotely control the source device 110 through the checked image. Also, a screen for parameter adjustment related to the setting of the receiver 130 may be displayed on the second bypass monitor 132 such that a user of the receiver 130 can change parameters related to the receiver 130 through the third user interface 134.

Also, the receiver 130 may be connected to the third user interface 134 to receive an input from a user of the receiver 130. In this case, the user input through the third user interface 134 may be an input for changing the parameter with respect to the receiver 130. Thus, the device settings of the receiver 130 may be changed. Alternatively, the input may be a control command with respect to the source device 110.

The transmitter 120 and the receiver 130 are separate hardware devices connected to each other through a network and disposed in pair at a distance from each other to transmit and receive a display screen and a remote control command of the source device 110. Since the function of the transmitter 120 and the function of the receiver 130 correspond to each other, one device may include both the functions of the transmitter 120 and the receiver 130, and may perform the function as a transmitter and the function as a receiver through a mode change, respectively.

RDS Transmitter (Tx)

Figure 2:
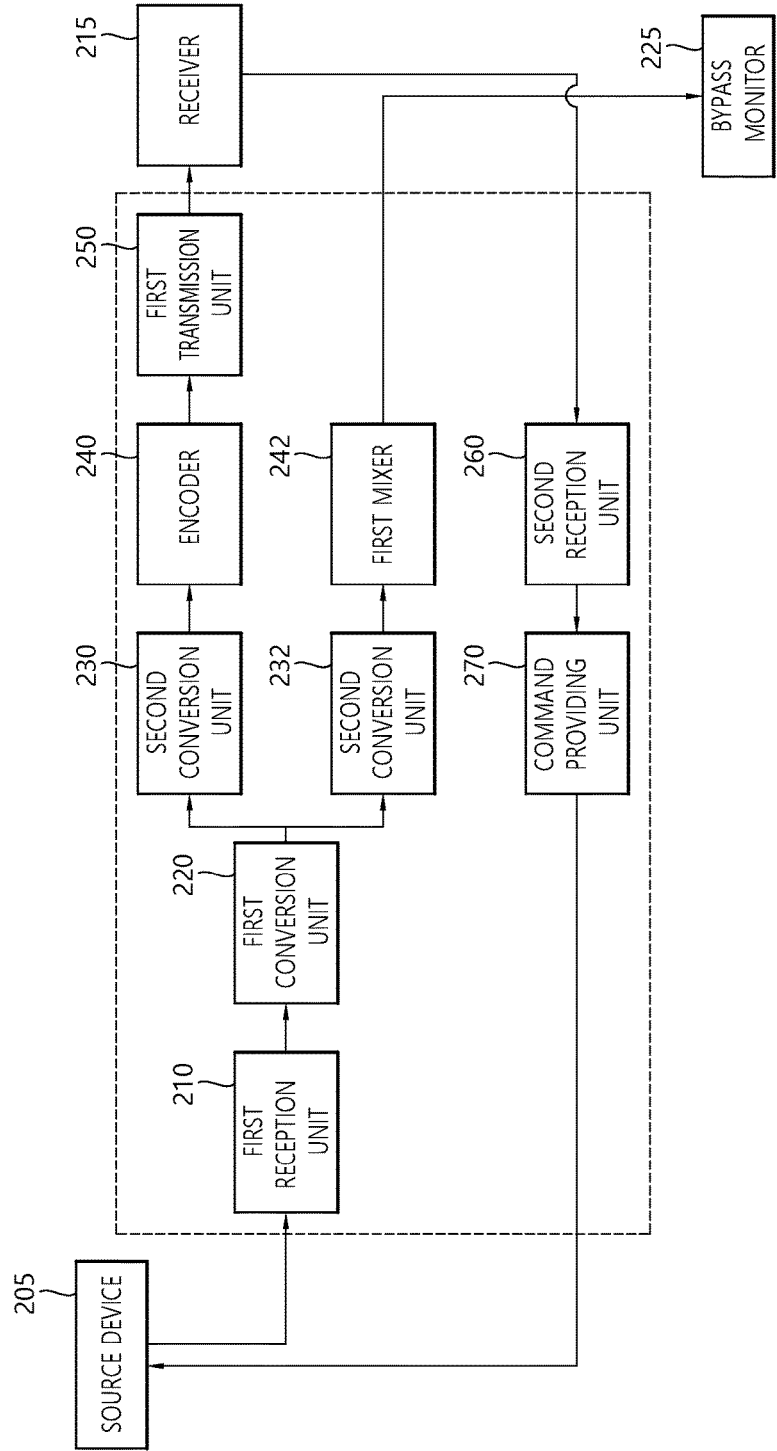
FIG. 2 is a view illustrating a transmitter for remote control support according to an embodiment of the present invention.

FIG. 2 is a view of a transmitter for remote control support according to an embodiment of the present invention. As shown in FIG. 2, a transmitter according to an embodiment of the present invention includes a first reception unit 210, a first conversion unit 220, second conversion units 230 and 232, an encoder 240, a mixer 242, a first transmission unit 250, a second reception unit 260, and a command providing unit 270. Each component may be implemented with a single hardware processor that executes commands related to the functions of each component, or may be implemented with a plurality of hardware processors according to each function or a combined function.

Referring to FIG. 2, the first reception unit 210 receives display screen data from a source device 205. The first reception unit 210 may receive the display screen data of the source device 205 in real-time while being connected to a digital interface.

The first reception unit 210 converts display screen data (video stream) received through a digital interface such as HDMI/DVI with a Mobile Industry Processor Interface for Camera Serial Interface (MIPI CSI). The MIPI CSI is an interface with a host processor and an imaging photographing device such as a camera. This complies with standard protocols such as CSI-1, CSI-2, CSI-3 and CSI-4.

The first conversion unit 220 receives MIPI CSI display image data from the first reception unit 210, and converts the MIPI CSI display image data into the YUV data format. According to an embodiment of the present invention, the converted YUV data may include a YUV 420 data format. The YUV 420 data formats may include a legacy YUV 420 for compatibility with existing systems and a non-legacy YUV 420 format for lower cost execution. The first conversion unit 220 provides display screen data of the YUV format to the second conversion units 230 and 232 through two divided channels. At this time, in the channel through the second conversion unit 230, transmission to the receiver 215 may be performed through encoding, and in the channel through the second conversion unit 232, screen data may be transmitted to a bypass monitor 225 through mixing.

The second conversion units 230 and 232 convert the YUV data into RGB data. Since the YUV format can have a high compression ratio, it is desirable to convert the YUV format into data of an RGB format of a low compression ratio having red (R), green (G), and blue (B). At least one of the 4:2:0, 4:2:2, and 4:4:4 conversion methods may be used as the conversion method of the second conversion unit 230. However, the present invention is not necessarily limited thereto.

The encoder 240 encodes the display screen data (video stream) of the source device 205 of the RGB format converted by the second conversion unit 230. Various encoding methods such as High Efficiency Video Coding (HEVC), H.264/AVC, Scalable Video Coding (SVC), Multiview Video Coding (MVC), DivX, and Window Media Video (WMV) may be used as the encoding method. This may be selected in the user settings, and may be changed through the user interface. Also, the encoder 240 may change the resolution, the frame rate, and/or the bit rate through the user setting to encode data. The encoder 240 may encode data by unit of one frame. Alternatively, the encoder 240 may encode data by unit of divided frames (e.g., ¼ frame) into which one frame is divided, and may provide the encoded data to the first transmission unit 250.

The first transmission unit 250 transmits the display screen data of the source device 205 encoded by the encoder 240 to the receiver 215. The first transmission unit 250 may receive and packetize one completed frame from the encoder 240, and then transmit the packetized frame to the receiver 215. Alternatively, the first transmission unit 250 may receive and packetize the encoded data of divided frame unit, and may transmit the packetized data to the receiver 215. The first transmission unit 250 transmits the encoded data to the receiver 215 through a real-time communication protocol such as RTP or RTSP.

The first mixer 242 mixes the display screen data of the RGB format, which is converted through the second conversion unit 232, into an outputable form through a digital interface such as HDMI/DVI. The mixed data are provided to the bypass monitor 225 connected through the digital interface.

In accordance with the output of the video stream through this mixing process, the bypass monitor 225 may display a screen, which is processed in the transmitter and transmitted to the receiver 215, to a user of the transmitter. A user of the transmitter may check the screen of the source device 205 to be currently remote-controlled, and may also check the screen of the source device 205 that is changed by the remote control. For example, when a user of the receiver 215 at a remote place clicks and opens a specific folder of the source device 205, a change in the screen of the source device 205 is displayed on the bypass monitor 225 such that a user can perceive the change.

The second reception unit 260 receives control commands from the receiver 215. The control commands, which are control commands at a remote place with respect to the source device 205, are commands that are provided by a user of the receiver 215 using a user interface (not shown) connected to the receiver 215 while viewing the screen of the source device 205. The control commands may include cursor movement, cursor click, character/number/sign input, command input, and the like.

The command providing unit 270 parses the control commands received from the second reception unit 260, and provides the parsed control commands to the source device 205. The source device 205 receives the parsed control commands, and implements the commands of a user of the receiver 215.

Figure 3:
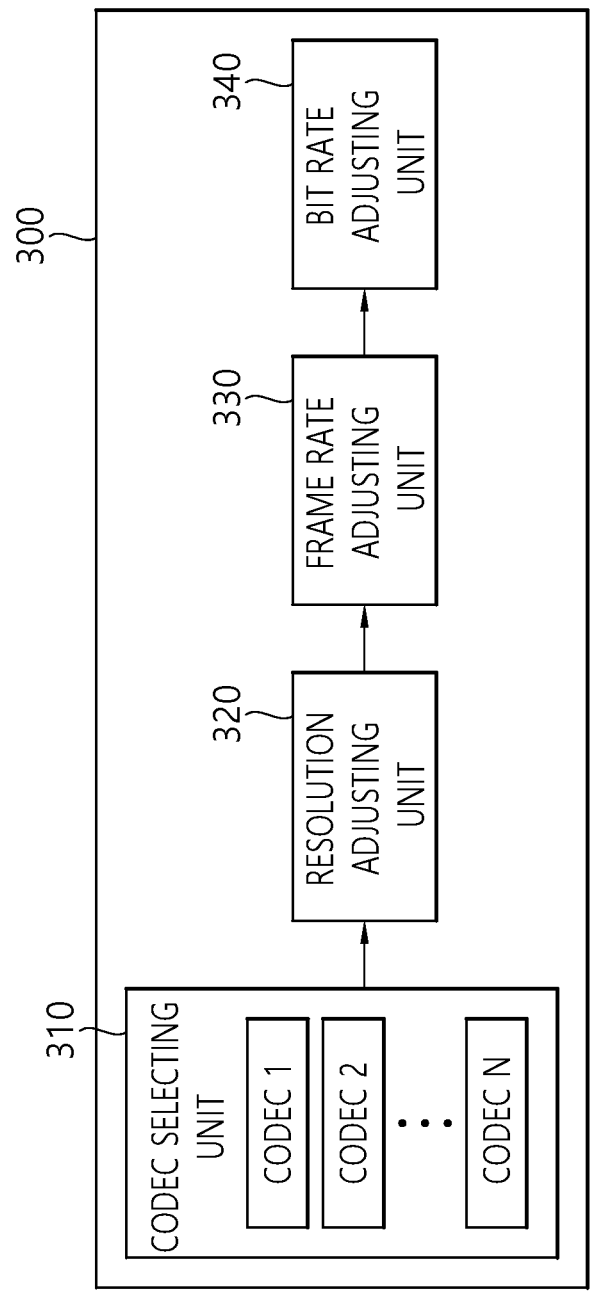
FIG. 3 is a detailed view illustrating an encoder of a transmitter for remote control support according to an embodiment of the present invention.

FIG. 3 is a detailed view illustrating an encoder of a transmitter for remote control support according to an embodiment of the present invention. As shown in FIG. 3, an encoder 300 according to an embodiment of the present invention may include a codec selecting unit 310, a resolution adjusting unit 320, a frame rate adjusting unit 330, and a bit rate adjusting unit 340.

Referring to FIG. 3, the codec selecting unit 310 selects one of a plurality of codecs (codec 1, codec 2, . . . codec N). The codec selecting unit 310 may select one of the plurality of codecs in accordance with a user setting. The codec selecting unit 310 performs encoding with the codec 1 set to the default, and when there is a change in the codec by the user setting, performs encoding through the codec 2.

The resolution adjusting unit 320 adjusts the resolution of the frame in regard to the encoding. That is, the degree of delicacy of the representation of the encoded data may be controlled. This may be defined as the numbers of horizontal pixels and vertical pixels. This may also have a numerical value that is set to a default value, and may be arbitrarily changed by a user through the user interface. Alternatively, a plurality of modes (1920×1080, 1024×768, or 1280×720) may be set, and one of the plurality of modes may be variably selected.

The frame rate adjusting unit 330 adjusts the frame rate in regard to encoding, and the bit rate adjusting unit 340 adjusts the bit rate. The frame rate and the bit rate are set to default values, and a user may arbitrarily change the corresponding value through the user interface. The frame rate may be defined as the number of frames per second, and the bit rate may be defined as the amount of information per second. A user may effectively adjust the quality of the display screen data of the source device by arbitrarily adjusting the frame rate and/or the bit rate. That is, when a user of the transmitter deals with high-quality data according to the characteristics of the source device, a user may allow the encoding to be performed by adjusting the encoding related parameters of the transmitter into high quality such that a remote user can watch the high-quality display screen. On the contrary, when it is acceptable to deal with comparatively low-quality data, the encoding-related parameters may be set to values appropriate for low-quality. Thus, the encoding efficiency can be improved.

Adaptive Encoding

Figure 4A:
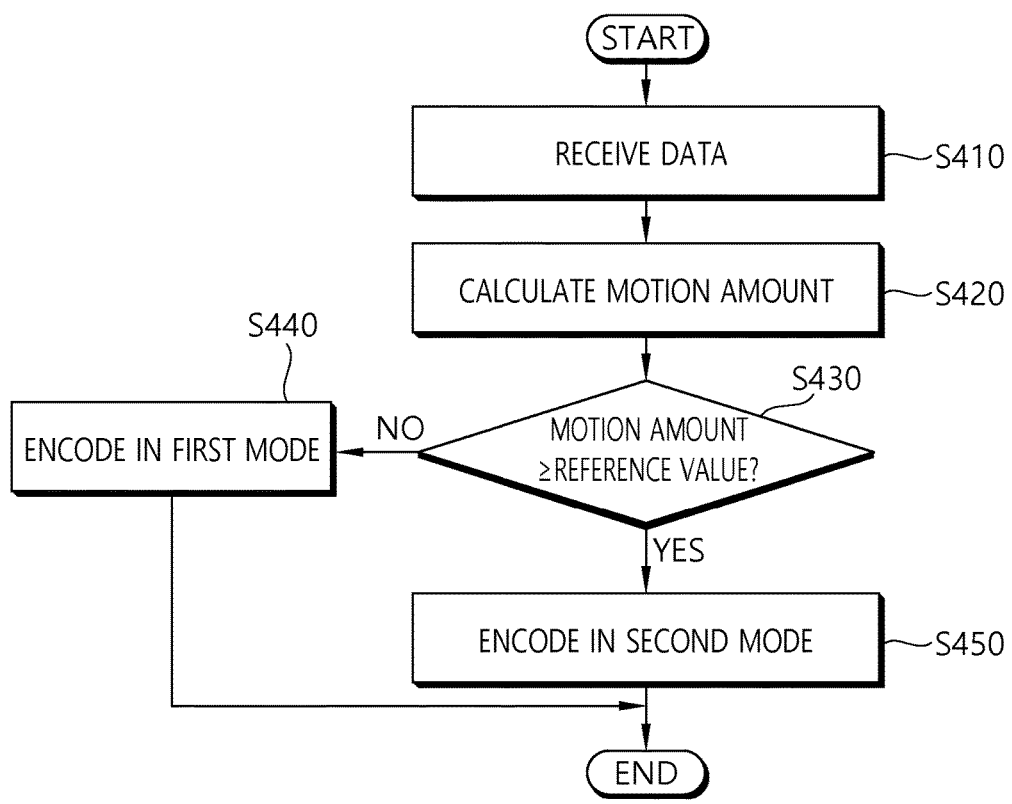
FIG. 4A is a flowchart illustrating an adaptive encoding method with respect to a motion amount of a transmitter for remote control support according to an embodiment of the present invention.

FIG. 4A is a flowchart illustrating an adaptive encoding method with respect to a motion amount of a transmitter for remote control support according to an embodiment of the present invention.

Referring to FIG. 4A, the transmitter receives display screen data, i.e., video stream, from the source device through the first receiver (S410). Then, the motion amount of the corresponding video stream is calculated (S420). The amount of motion may be calculated through the amount of change of a plurality of subframe signals generated by time-sharing the video stream. Alternatively, instead of comparing the subframes, the amount of motion can be calculated by directly comparing the amounts of change between continuous frames.

Thereafter, the calculated motion amount is compared with a reference value regarding a preset motion amount (S430). As a result of comparison, when the motion amount is larger than the reference value, a first mode encoding method appropriate for processing of a video stream having a lot of motion is selected to perform encoding (S440). The reference value may be determined through the user setting. When the motion amount is smaller than the reference value, a second mode encoding method appropriate for processing of video stream having less motion may be selected to perform encoding (S450).

In this case, the encoding method of the first mode may differ from the encoding method of the second mode in at least one of codec, resolution, frame rate and bit rate. For example, the first mode applied to a stream in which the motion amount is large may be a basic streaming mode, and the second mode applied to a video in which the motion amount is small may be a residual value-based encoding mode. Also, in case of the second mode, since there are many pixels on a still screen, there is a probability that the boundary lines included in the corresponding screen seem ambiguous. Accordingly, the corresponding frame may be interpolated to generate a plurality of subframes and perform encoding.

Figure 4B:
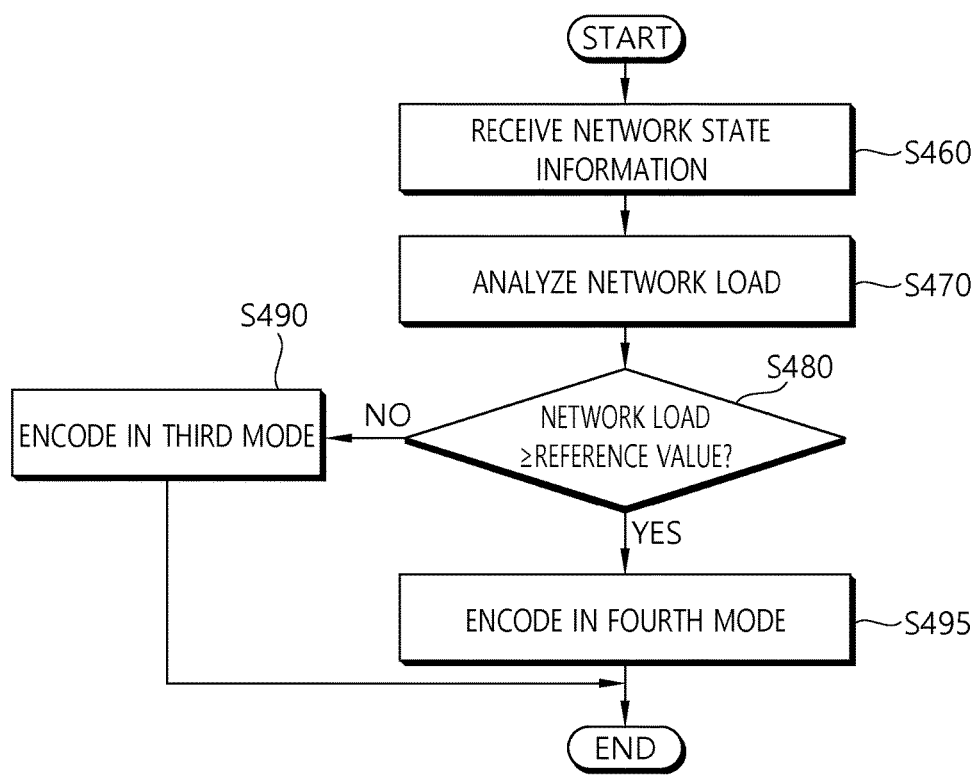
FIG. 4B is a flowchart illustrating an adaptive encoding method through a network load analysis of a transmitter for remote control support according to another embodiment of the present invention.

FIG. 4B is a flowchart illustrating an adaptive encoding method through a network load analysis of a transmitter for remote control support according to another embodiment of the present invention.

Referring to FIG. 4B, the transmitter obtains network state information in real-time (S460). The network state information may be obtained through Channel State Information (CSI). Next, a current network load is analyzed based on the obtained state information (S470). It is determined according to the analysis result whether the current network load is greater than a reference value (S480). If the current network load is not greater than the reference value, encoding is performed in a third mode (S490. If the current network load is greater than the reference value, encoding is performed in a fourth mode (S495). Here, the reference value is different from the reference value of FIG. 4A. Encoding may be performed in a form appropriate for the current network load through multiple encoding. In this case, if the network load is higher than the reference value, encoding may be performed with a lower quality by lowering the bit rate and the frame rate, and if the network load is lower than the reference value, encoding may be performed with a higher quality. The third or fourth mode may be configured by differently setting encoding-related factors as well as the bit rate and frame rate. Also, the analyzed network state information may be displayed on the screen through a Web UI. To this end, expression methods such as charts and graphs may be used.

Network Setting

Figure 5:
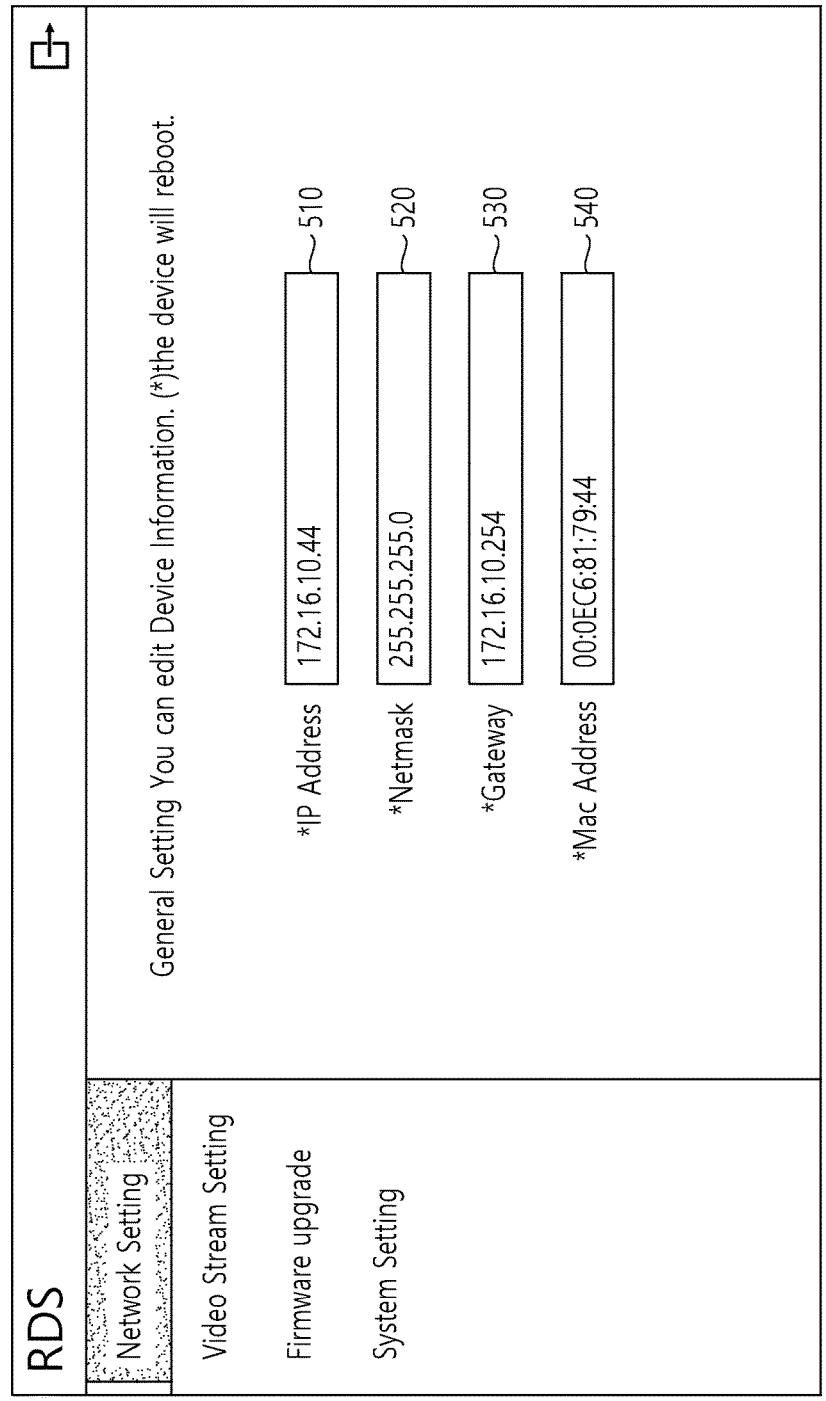
FIG. 5 is a view illustrating a network setting screen of a transmitter for remote control support according to an embodiment of the present invention.

FIG. 5 is a view illustrating a network setting screen of a transmitter for remote control support according to an embodiment of the present invention.

Referring to FIG. 5, the transmitter includes unique network information. The network information may include at least one of an IP address, a netmask, a gateway address, and a MAC address. Since the transmitter has a unique network address, the transmitter may be connected to the receiver via a wired or wireless IP network or a communication network. In this case, a user may check currently set network information through a network setting display screen of the transmitter shown in FIG. 5, and can change the IP address through a block 510, the netmask through a block 520, the gateway address through a block 530, and the MAC address through a block 540 using a user interface.

Setting Encoding Parameter

Figure 6:
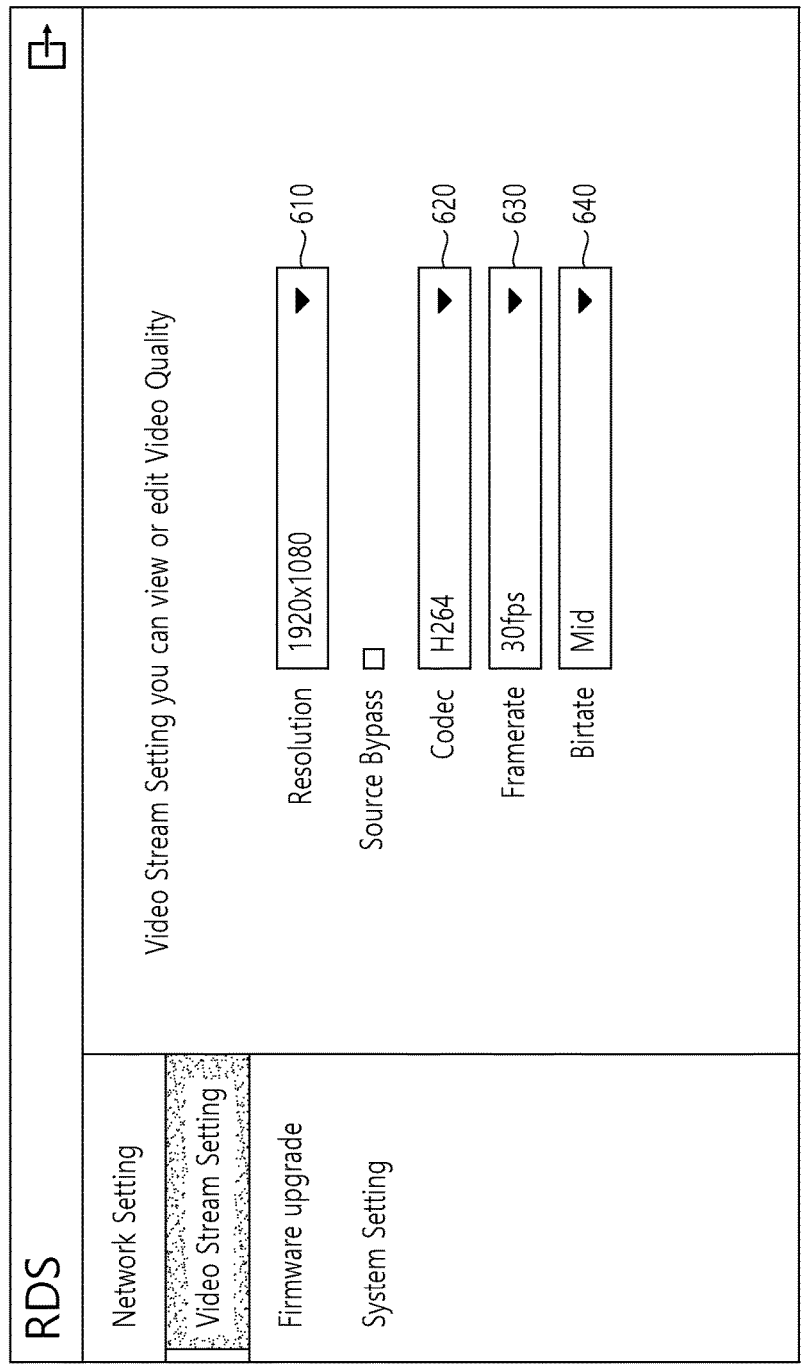
FIG. 6 is a view illustrating an encoding parameter setting screen of a transmitter for remote control support according to an embodiment of the present invention.

FIG. 6 is a view illustrating an encoding setting screen of a transmitter for remote control support according to an embodiment of the present invention.

Referring to FIG. 6, the video quality and the codec method for a video stream may be adjusted. The resolution may be set through a block 610, and the type of codec may be set through a block 620. Also, the frame rate may be set through a block 530, and the bit rate may be set through a block 540. The bit rate may be set to high rate, middle rate, and low rate as a basic setting, one of which may be selected.

Also, although not shown in the drawing, it is possible to set whether or not to use a mode switching method according to the amount of motion of a video stream, and a user may arbitrarily change the encoding parameter information of a plurality of modes used in this case.

Firmware Upgrade

Figure 7:
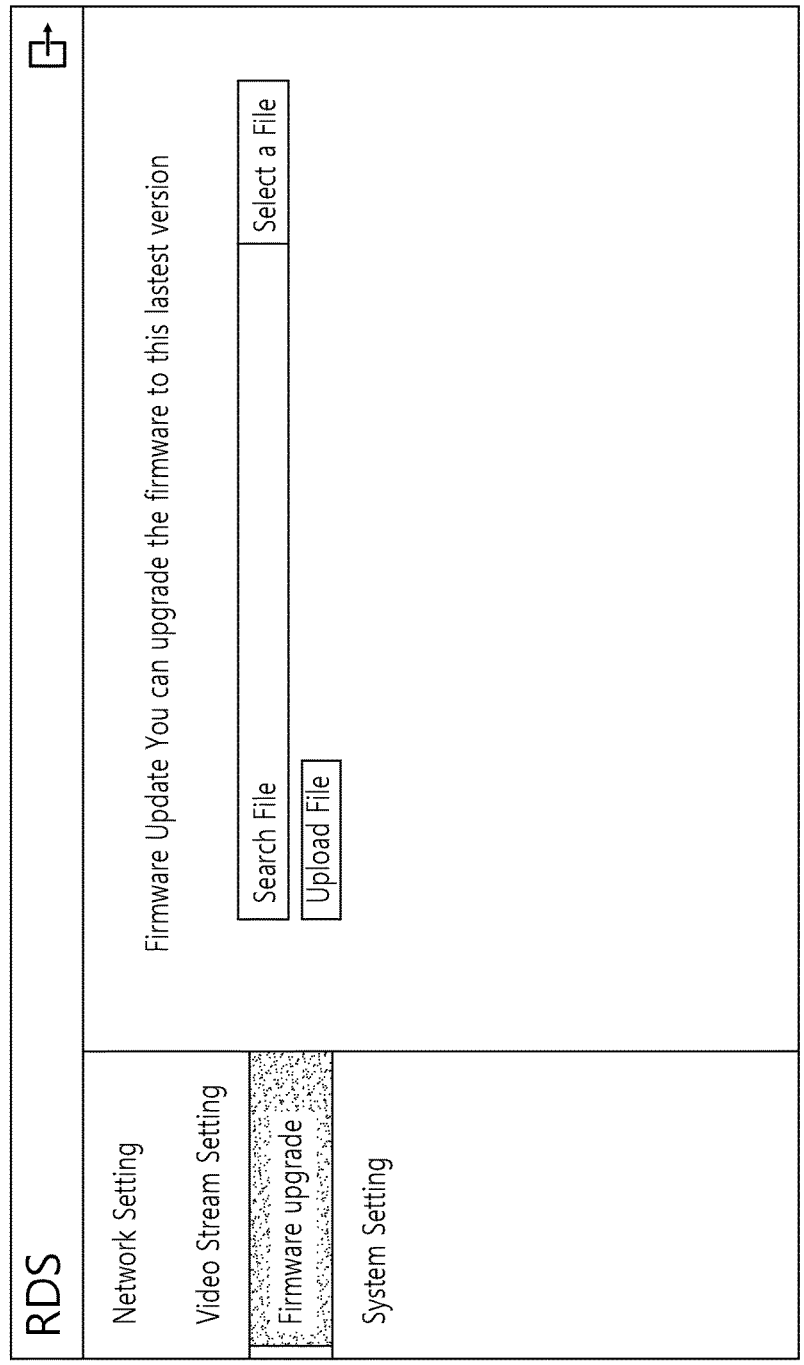
FIG. 7 is a view illustrating an upgrade setting screen of a firmware of a transmitter for supporting remote control according to an embodiment of the present invention.

FIG. 7 is a view illustrating an upgrade setting screen of a firmware of a transmitter for supporting remote control according to an embodiment of the present invention.

Referring to FIG. 7, the transmitter is operated based on a firmware, and may operate based on a specific firmware through firmware search and selection. Also, firmware of the latest version may be searched to perform upgrading based on a network. This is for upgrading into an improved version, and firmware provided from a server side of a manufacturer which manages the firmware may be searched and selected for each version. In this case, when a user searches for firmware, a list of usable firmware is displayed. Firmware that is previously downloaded may be stored in a storage, and may be saved for later selection and utilization.

According to the embodiment of the present invention, since the latest firmware distributed by the server is provided to be installable in real-time, a user of the transmitter may upgrade the firmware in real-time by selecting and uploading the latest firmware that is provided.

According to another embodiment of the present invention, when one transmitter and/or receiver are upgraded with the latest firmware, the other receiver and/or transmitter connected in pair thereto may also be configured to be automatically upgraded with the corresponding firmware.

Mode Switching

Figure 8:
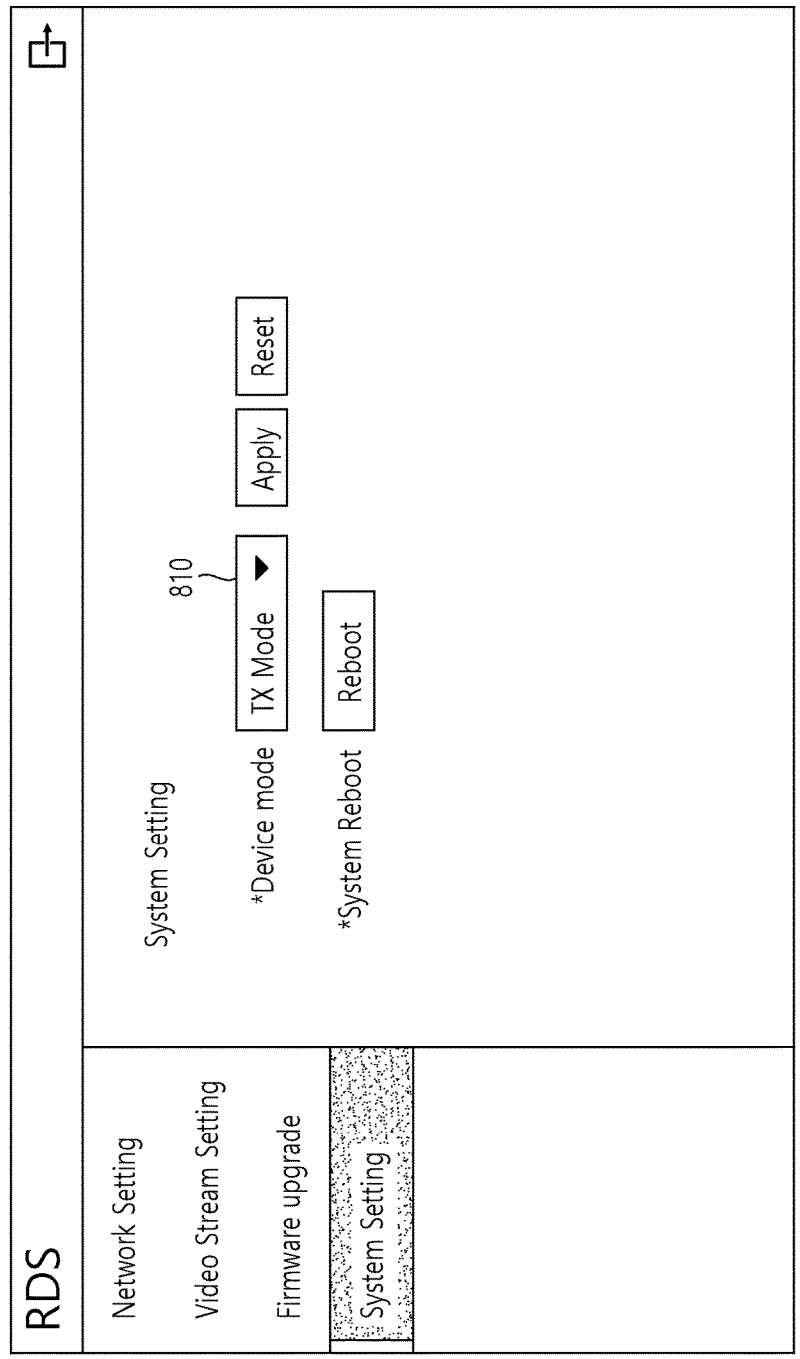
FIG. 8 is a view illustrating a mode setting screen of a transmitter for remote control support according to an embodiment of the present invention.

FIG. 8 is a view illustrating a mode setting screen of a transmitter for remote control support according to an embodiment of the present invention.

Referring to FIG. 8, one device may include the function of the transmitter and the function of the receiver corresponding thereto, and thus may perform the function as the transmitter and the function as a receiver through device mode switching of a block 810. When the mode is changed, switching may occur at a contact point between a channel related to transmitter components and a channel related to receiver components, and the function may be reversed. That is, a function change from the transmitter to the receiver or from the receiver to the transmitter may occur. For example, when the function of the first device that receives and encodes display screen data of the first source device and then transmits the encoded display screen data to the second device is changed from the transmitter to the receiver, the first device receives and decodes display screen data of the second source device connected to the second device from the second device and then displays the decoded display screen data on the bypass monitor that is connected. Then, control commands inputted from a user based on the displayed screen may be transmitted to the second device.

Thus, when a mode change of the transmitter and the receiver occurs, it may be desirable to reboot.

Remote Control Via Wireless Network

Figure 9:
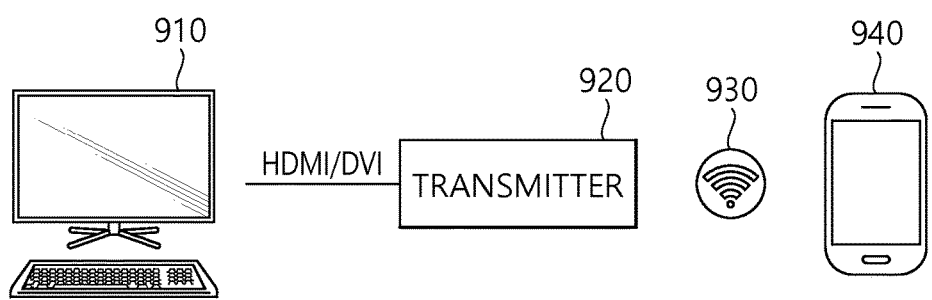
FIG. 9 is a conceptual view illustrating an operation of a receiver for receiving image information from a transmitter via a wireless network.

FIG. 9 is a conceptual view illustrating an operation of a receiver for receiving image information from a transmitter via a wireless network.

Referring to FIG. 9, a transmitter 920 may receive display screen data of a source device 910, and may transmit the display screen data to a receiver 940 via a wireless local area network 930.

According to an embodiment of the present invention, the wireless local area network 930 used to transmit the display screen data of the source device 910 to the receiver 940 may include Wi-Fi, Bluetooth, ZigBee, Near Field Communication (NFC), Radio Frequency Identification (RFID), and the like. The transmitter 920 may transmit the display screen data of the source device 910 in real-time to the neighboring receiver 940 through the wireless local area network 930. According to another embodiment of the present invention, wireless communication methods of wide coverage such as Long Term Evolution (LTE), LTE-A, and 3G may be used in addition to short-range wireless communication.

In this case, the receiver 940 may be a mobile terminal located around the transmitter 920, and the mobile terminal may be a terminal installed with an application for remote control through pairing with the transmitter 920, and may perform the function of the receiver through execution of the application.

Figure 10:
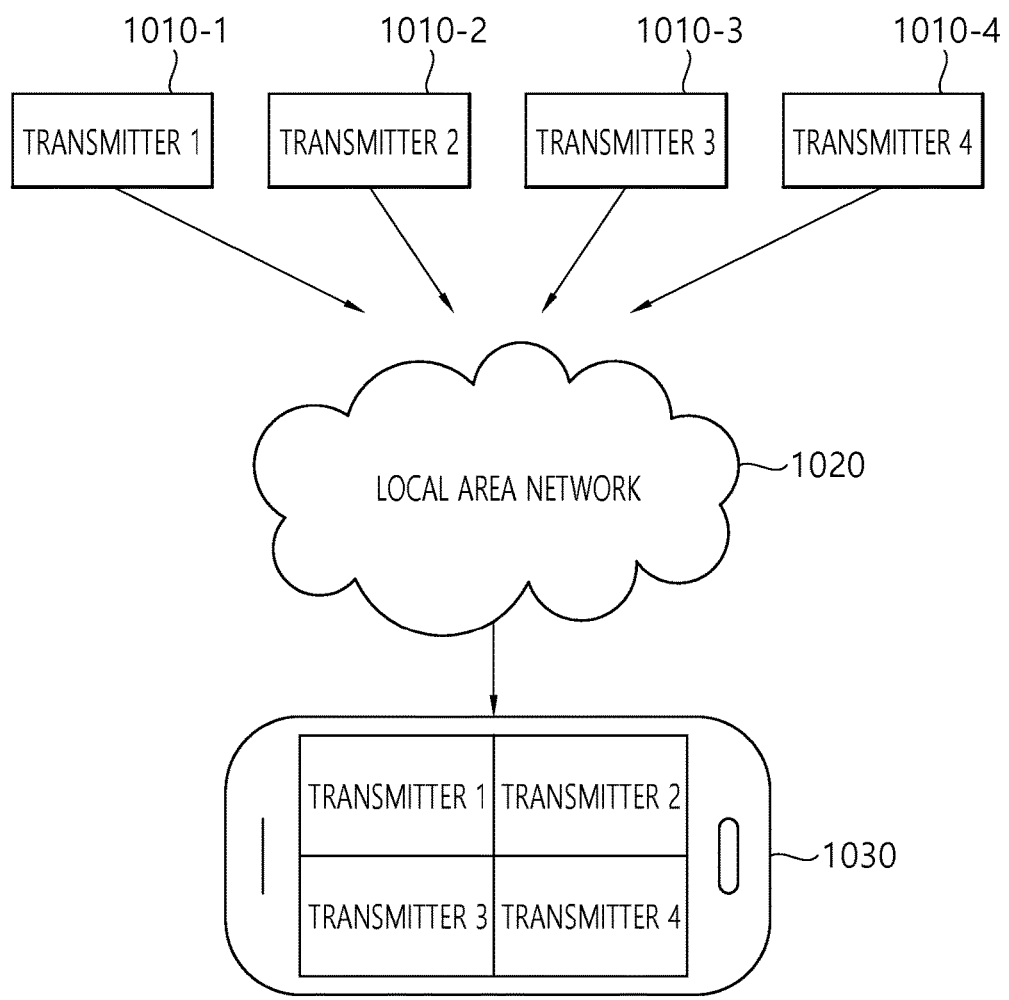
FIG. 10 is a conceptual view illustrating an operation of a receiver that combines and expresses image information transmitted from a plurality of transmitters through a local area network in one screen.

FIG. 10 is a conceptual view illustrating an operation of a receiver that combines and expresses image information transmitted from a plurality of transmitters through a local area network in one screen.

Referring to FIG. 10, a plurality of transmitters 1010-1, 1010-2, 1010-3 and 1010-4 may transmit display screen data of source devices (not shown) each connected to a receiver 1030 through a local area network 1020. The receiver 1030 may select the transmitters 1010-1, 1010-2, 1010-3, and 1010-4 to which the receiver 1030 is connected. In this case, there is no particular limitation in the number of transmitters that can be connected.

The plurality of transmitters 1010-1, 1010-2, 1010-3, and 1010-4 connected to the receiver 1030 through the local area network 1020 may provide, to the receiver 1030, the display screen data of the source device to which the plurality of transmitters 1010-1, 1010-2, 1010-3 and 1010-4 are each connected, and the receiver 1030 may combine and display the screens of the transmitters 1010-1, 1010-2, 1010-3 and 1010-4 as a single page in accordance with the screen layout set by the receiver 1030. In this case, a plurality of cells may be disposed in the screen of the receiver 1030, and the size of each cell and the horizontal and vertical sizes of the cell may be adjusted through user setting. In this case, the receiver 1030 may recognize the division of each cell, and when a user of the receiver 1030 inputs a remote control command in a specific cell, may transmit the inputted control command to the corresponding transmitter. Thus, control performed in the division of cell may be transmitted to the corresponding source device of the transmitter.

Also, while the screens related to the plurality of transmitters are being displayed, a user of the receiver 1030 selects one of the screens and displays only the selected screen of the transmitter on the entire screen. Then, a user of the receiver 1030 may control the selected transmitter via a user interface (e.g., touch screen in this embodiment).

Dual Monitor Screen Processing

Figure 11:
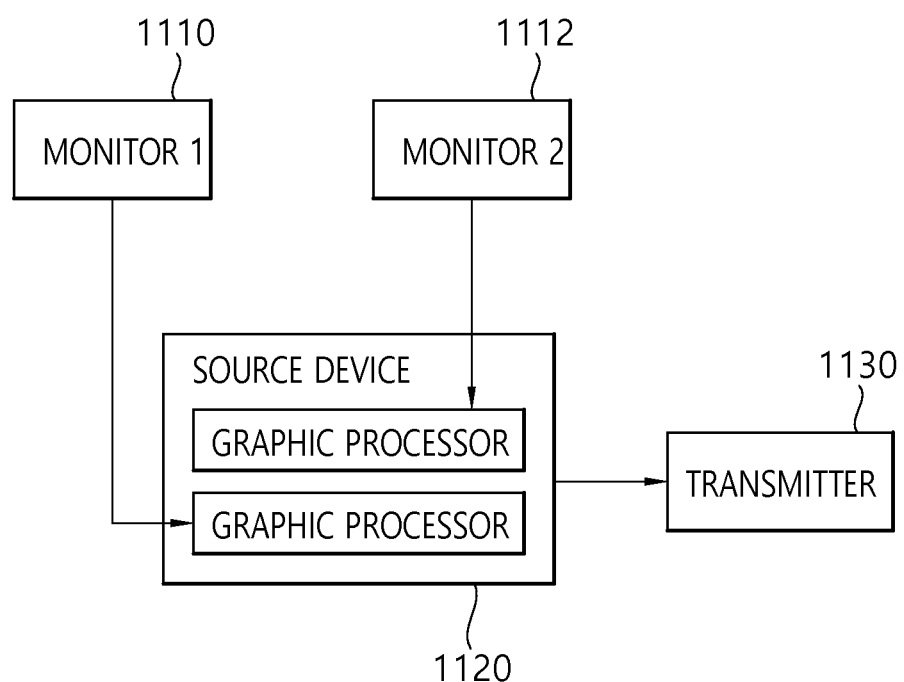
FIG. 11 is a view illustrating a transmitter processing a screen of a source device using a dual monitor.

FIG. 11 is a view illustrating a transmitter processing a screen of a source device using a dual monitor.

Referring to FIG. 11, a source device 1120 may be dual-connected to a first monitor 1110 and a second monitor 1112, and may receive two display screen data (video streams) from the first and second monitors 1110 and 1112. In this case, each monitor may be connected to one graphic processor to process the display screen data, and the source device 1120 may simultaneously parallel-process two display screen data through two graphic processors. The two display screen data processed in this way may be provided to a transmitter 1130. The transmitter 1130 may receive the display screen data processed by the two graphic processors in the source device 1120, and may combine the display screen data into a single screen or selectively process one of the two screens to provide the selectively processed screen to a receiver. The transmitter 1130 may generate a single screen by combining the two display screen data of the dual monitors 1110 and 1112 in a predetermined ratio (e.g., 1:1, 2:1, etc.), and then may encode and transmit the single screen to the receiver. Alternatively, one (e.g., first monitor 1110) of two monitor screens may be selected according to the setting of a user, and only the corresponding screen may be encoded and then transmitted to the receiver. It may be selected through the user setting which monitor screen is encoded and transmitted.

RDS Receiver (Rx)

Figure 12:
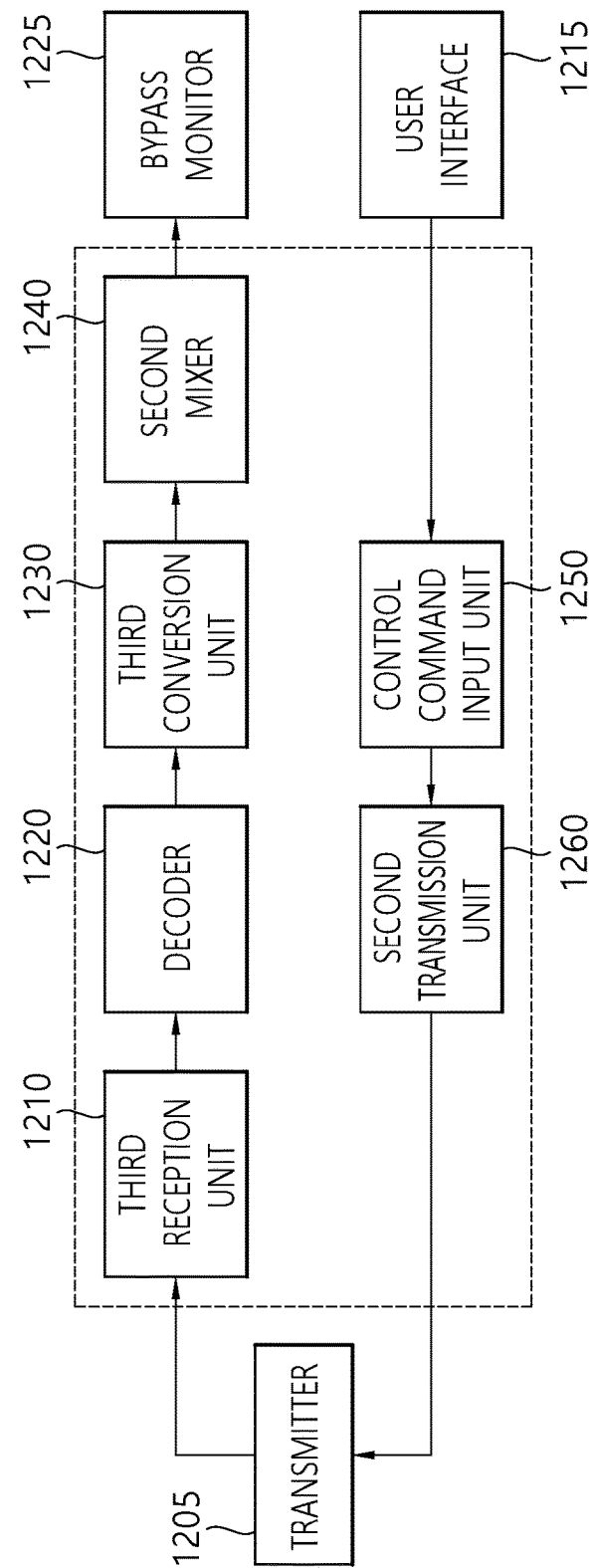
FIG. 12 is a view illustrating a receiver for remote control support according to an embodiment of the present invention.

FIG. 12 is a view of a receiver for remote control support according to an embodiment of the present invention. Referring to FIG. 12, a receiver according to an embodiment of the present invention may include a third reception unit 1210, a decoder 1220, a third conversion unit 1230, a second mixer 1240, a control command input unit 1250, and a second transmission unit 1260. Each component may be implemented with a single hardware processor that executes commands related to the functions of each component, or may be implemented with a plurality of hardware processors according to each function or a combined function.

Referring to FIG. 12, the third receiving unit 1210 receives an encoded video stream (display screen data of the source device) from a transmitter 1205. The third reception unit 1210 may be implemented as a communication processor.

The decoder 1220 decodes the encoded video stream received by the third reception unit 1210. The decoding may be performed by a method corresponding to the encoding method. The decoder 1220 may decode the encoded video stream into data of a YUV format. In this case, the YUV data may be YUV420 data.

The third conversion unit 1230 converts the YUV data decoded by the decoder 1220 into RGB data. This may be performed in a manner similar to the operation of the second conversion unit of the transmitter (see FIG. 2).

The second mixer 1240 mixes the converted by the third conversion unit 1230 such that the RGB data can be transmitted through a digital interface such as HDMI/DVI. The mixed data are provided to a bypass monitor 1225 such that a recipient of the receiver can view the screen of the remote source device via the bypass monitor 1225.

In this case, a user of the receiver may input a control command through a user interface 1215. The user interface 1215 may include a touch screen, a keyboard and/or a mouse, and the control command may be inputted by touching the touch screen, typing the keyboard, and/or scrolling the wheel of the mouse or clicking the mouse.

The control command input unit 1250 generates a control command based on an input by a user via the user interface 1215 as described above, and provides the control command to the second transmission unit 1260.

The second transmission unit 1260 receives the inputted control command 1250, and transmits the received control command 1250 to the transmitter 1205 through a wired or wireless network.

Transmitter List Management

Figure 13:
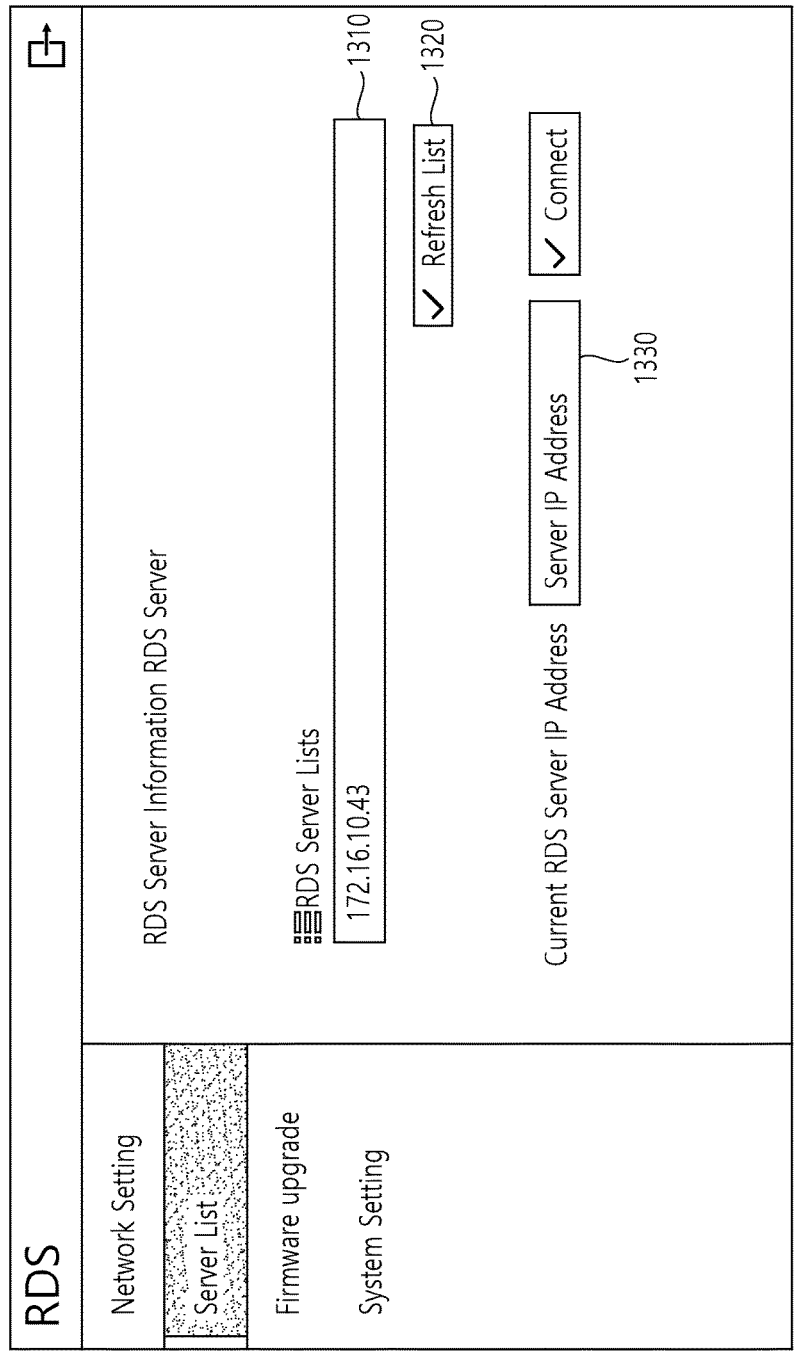
FIG. 13 is a view illustrating a transmitter list management screen of a receiver for remote control support according to an embodiment of the present invention.

FIG. 13 is a view illustrating a transmitter list management screen of a receiver for remote control support according to an embodiment of the present invention.

Referring to FIG. 13, a receiver may generate a transmitter list 1310 that indicates information of a connectable transmitter. The receiver may identify the transmitter with the network address (e.g., IP address, etc.) of the transmitter to generate a list of connectable transmitters. In this case, the connectable transmitter may be a transmitter with which the receiver recognizes a connection in the past or the present. That is, a previously connected transmitter and/or a transmitter currently connected via a wired or wireless network may be included in the list.

The receiver may refresh the list by clicking on a refresh list block 1320.

In this case, the address of the currently connected transmitter may be displayed in a block 1330. Alternatively, when one of the transmitters included in the list is selected, the IP address is inputted into the block 1330. In this case, when a connection request block provided at the right side of the server IP address is clicked, the transmitter of the corresponding address may be connected.

According to an embodiment of the present invention, a receiver may select a plurality of transmitters included in the transmitter list to receive video streams from the plurality of transmitters.

According to another embodiment of the present invention, the receiver also includes a network address, and a firmware upgrade may also be performed on the receiver like the transmitter. Also, it is possible to switch to the transmitter mode through system setting.

Bidirectional Control System

Figure 14:
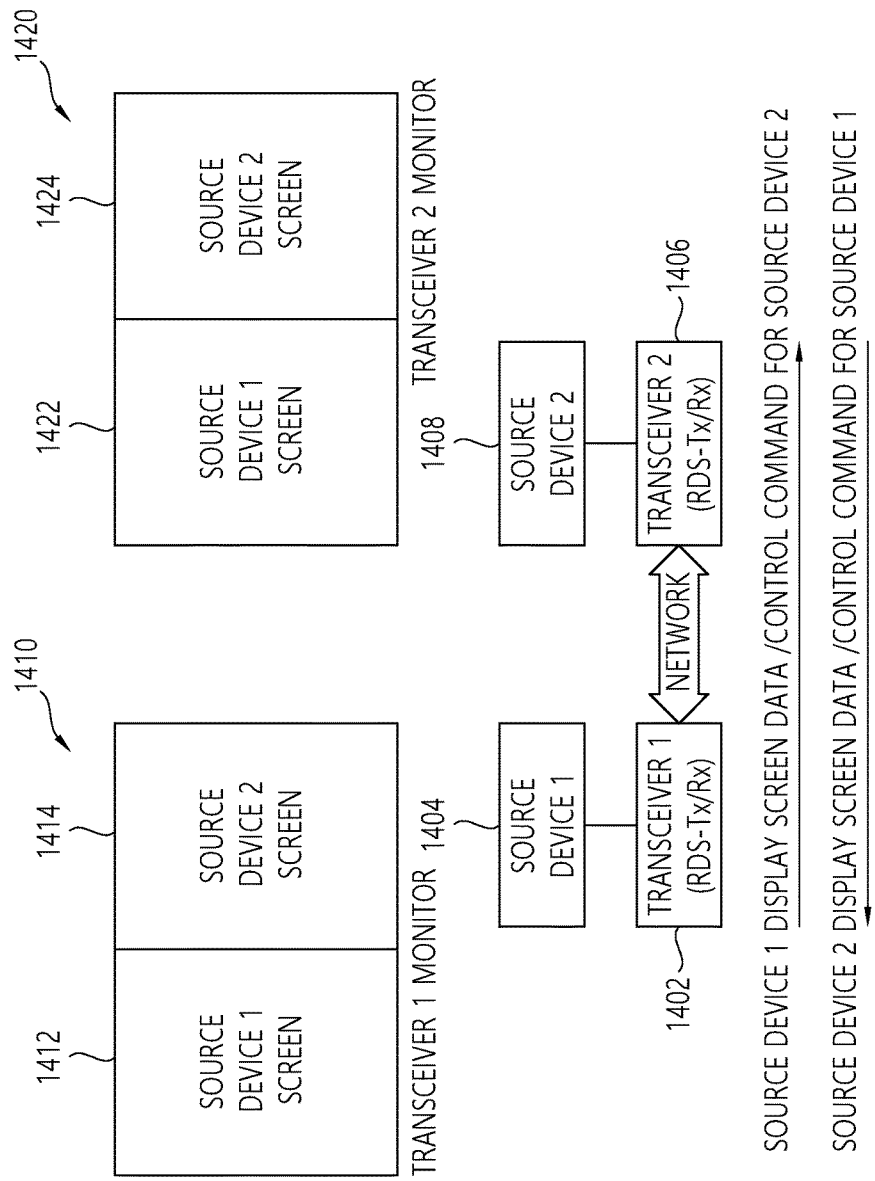
FIG. 14 is a view illustrating a bidirectional control system according to an embodiment of the present invention.

FIG. 14 is a view illustrating a bidirectional control system according to an embodiment of the present invention.

Referring to FIG. 14, a first source device 1404 is wired and/or wirelessly connected to a first transceiver 1402 to transmit screen data to the first transceiver 1402, and the first transceiver 1402 transmits the screen data of the first source device 1404 to a second transceiver 1406 through a network On the other hand, a second source device 1408 is wired and/or wirelessly connected to a second transceiver 1406 to transmit screen data to the second transceiver 1406, and the second transceiver 1406 transmits the screen data of the second source device 1408 to the first transceiver 1402 through the network In this case, each of the transceivers 1402 and 1406 may be a device equipped with both transmitter functions and receiver functions for remote control support, and bypass monitors 1410 and 1420 connected to each of the transceivers 1402 and 1406 may display the screens of terminals to be controlled and provided through the two transceivers 1402 and 1406, i.e., the screens of the first and second source devices 1404 and 1408 on each of monitors 1410 and 1420.

That is, the screens 1412 and 1422 of the first device are displayed on a part of the left side of the screen, and the screens 1414 and 1424 of the second source device are displayed on a part of the right side of the screen. Thus, each of the transceivers 1402 and 1406 may transmit and receive synchronization screen data of the source devices 1404 and 1408 connected, respectively. That is, control can be performed in both directions while viewing the same screen.

In this case, a control command for the counterpart source device may be provided. That is, the first transceiver 1402 transmits screen data of the first source device 1404, and may provide a control command for the second source device 1408 according to a need. On the contrary, the second transceiver 1406 may transmit screen data of the second source device 1408, and may provide a control command for the first source device 1404.

Bidirectional Conference System

Figure 15:
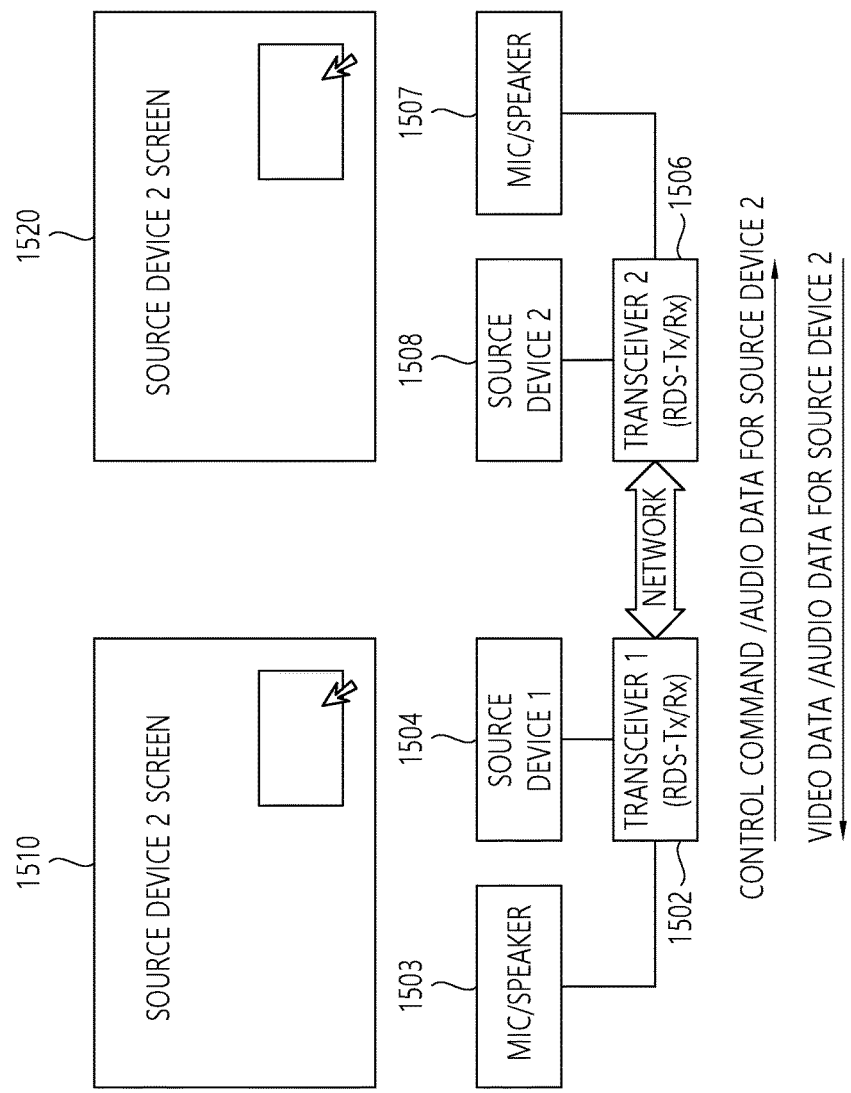
FIG. 15 is a view illustrating a bidirectional conference system according to an embodiment of the present invention.

FIG. 15 is a view illustrating a bidirectional conference system according to an embodiment of the present invention.

Referring to FIG. 15, each of the transceivers 1502 and 1506 includes both transmitter functions and receiver functions for remote control support. Also, a first source device 1504 is wired and/or wirelessly connected to the first transceiver 1502, and a second source device 1508 is wired and/or wirelessly connected to the second transceiver 1506. Here, although two source devices are described as being connected, the bidirectional conference system of the present invention may be utilized even when ten or more devices are connected and a plurality of participants execute a video conference.

In this case, a monitor connected to the first transceiver 1502 and/or a monitor 1510 of the first source device 1504 may display the screen of the second source device 1506. That is, the second source device 1508 and the first source device 1504 may view the same screen. In this embodiment, when there are three or more participants, the conference may proceed while three transceivers identically display the screen of a third source device. That is, the real-time encoded data of the screen of the source device of each conference participant are transmitted and received to/from each other, and the screen of a specific source device is simultaneously displayed according to the selection of each transceiver to allow the conference to be performed while simultaneously viewing in real-time the contents (document, video, audio file, etc.) processed in the specific source device. In this case, it is preferable that video and audio are separately processed in the transceivers 1502 and 1506 to be outputted through microphone/speaker 1503 and 1507 connected, respectively.

Particularly, when the screen of the second source device 1508 is simultaneously transmitted and received through the transceivers 1502 and 1506 and participants view the screen through the connected monitors 1510 and 1520 by the medium of the connected monitors 1510 and 1520, a control command for the second source device may be transmitted through a user interface (not shown) connected to the first transceiver 1502 or a user interface (not shown) connected to the first source device 1504, and audio data for the conference may be transmitted to the second transceiver 1506. In this case, the second transceiver 1506 may transmit synchronous screen video data of the second source device 1508, and may transmit audio data inputted through the connected microphone 1507 to the first transceiver 1502.

Also, video data, audio data and/or control commands transmitted in real-time at the same time are received by the transceivers 1502 and 1504, and are classified so as to be independently processed.

The screen data are transmitted to the second transceiver 1506, and the second transceiver 1506 transmits the screen data of the second source device 1508 to the first transceiver 1502 through the network.

In this case, each of the transceivers 1502 and 1506 may be a device equipped with both transmitter functions and receiver functions for remote control support, and bypass monitors 1510 and 1520 connected to each of the transceivers 1502 and 1506 may display the screens of terminals to be controlled and provided through the two transceivers 1502 and 1506, i.e., the screens of the first and second source devices 1504 and 1508 on each of monitors 1510 and 1520.

Interlocking with System Monitoring Server (Control Server)

As described in FIG. 1, in one embodiment of the present invention, a source device connected to a transmitter may be a control server that receives sensing information from an IoT-based sensor, a camera, or the like and manages the entire process or system. In this case, the control server monitors the abnormality of the system in real-time based on the sensing information and the image information obtained from the camera, and notifies a manager of the abnormality by generating an event signal when an abnormality occurs. The control server may store the obtained sensing information and image information in a mass storage according to the order of time. When stored, each piece of information may be stored as an object in a time information and specific visualization space, and sensing information and/or images of a specific sensor and/or camera at a specific point time may be managed to as to be retrieved in future. The transmitter connected to the control server may display a large amount of sensing and image information managed through the control server to a remote user through the transmitter and the receiver, and a user may view the displayed screen contents and provide a control command. That is, the occurrence of an event may be recognized at a remote place, and the sensing information and/or the image information of a specific sensor and/or a specific camera at the time of occurrence of an abnormality may be checked in response to the occurrence of the abnormality.

According to an embodiment of the present invention, when an event occurs while monitoring the sensing information and/or image information, the control server may detect a time point when an abnormality occurs. Then, the control server may provide the detected time point information to the transmitter. The transmitter may store a video stream (display screen data of the control server) received from the control server within a certain time interval before and after the occurrence of the abnormality in a storage inside or outside the transmitter. This operation may be automatically performed.

Even though a user of the receiver fails to check the display screen data of the control server provided to the receiver at the time of occurrence of the abnormality, the receiver may request the transmitter to provide a video of the abnormality occurrence time point through an input of a user, and may be provided with the stored video steam.

According to the transmitter and receiver for remote control support, the operation method of the transmitter and the receiver, and the remote control system, the transmitter and the receiver take charge of the load of the remote control-related operations of the source device, thereby preventing the speed of the source device from slowing down and achieving smooth remote control.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A transmitter (Tx) for remote control support, connected to a source device, the transmitter comprising:
   a first reception unit for receiving display screen data of the source device;
   an encoder for encoding the display screen data received at the first reception unit; and
   a first transmission unit for transmitting the encoded data to a receiver using a real-time communication protocol,
   wherein the transmitter is a hardware device wired to the source device through a digital interface,
   wherein at least one of a resolution, a codec type, a frame rate and a bit rate is used by the encoder for encoding factors of the display screen data, and
   wherein the encoder arbitrarily changes at least a portion of the encoding factors through a user interface.

2. The transmitter of claim 1, further comprising:
a second reception unit for receiving a control command received from the receiver; and
a command providing unit parsing the control command received at the second reception unit and providing the control command to the source device.

3. The transmitter of claim 1, further comprising:
a first conversion unit for converting the display screen data into YUV data; and
a second conversion unit for converting the YUV data into RGB data.

4. The transmitter of claim 3, wherein the second conversion unit generates a plurality of converted data through a plurality of channels and provides the converted data to the encoder and a mixer, and
the mixer performs mixing to display the converted data on a first display unit by bypassing through the digital interface.

5. The transmitter of claim 1, wherein the receiver comprises a mobile terminal located around the transmitter, and
the transmitter transmits the encoded data to the mobile terminal through a wireless local area network.

6. The transmitter of claim 5, wherein the mobile terminal receives first encoded image data from a first transmission unit and second encoded image data from a second transmitter, and combines and displays the first and second encoded image data on a single screen.

7. The transmitter of claim 1, wherein the transmitter has at least one of a unique IP address, a netmask, a gateway address, and a MAC address, and
arbitrarily changes at least a portion of the address information through a user interface.

8. The transmitter of claim 1, comprising a function of a receiver for receiving and decoding encoded data from another transmitter and providing the decoded data to a display unit, and
arbitrarily switching an operation mode between a transmitter and a receiver through a user interface.

9. The transmitter of claim 1, when encoding the display screen data, encoding an image having a motion amount larger than a reference value in a first mode and encoding an image having a motion amount smaller than the reference value in a second mode.

10. The transmitter of claim 1, wherein a current network load is analyzed in real-time, and the encoding of the display screen data is performed in a third mode when the network load is higher than a reference value and in a fourth mode when the network load is lower than the reference value.

11. The transmitter of claim 1, wherein when the source device provides an event signal to the transmitter, the transmitter stores display screen data at time points before and after the event signal is provided.

12. The transmitter of claim 11, wherein display screen data stored in response to a request from the receiver for display screen data at the time points before and after the event signal is provided are provided to the receiver.

13. An operation method of a transmitter (Tx) for remote control support, connected to a source device, the method comprising:
receiving display screen data of the source device;
encoding, by a encoder, the received display screen data; and
transmitting the encoded data to a receiver using a real-time communication protocol,
wherein the transmitter is a hardware device wired to the source device through a digital interface,
wherein at least one of a resolution, a codec type, a frame rate and a bit rate is used by the encoder for encoding factors of the display screen data, and
wherein the encoder arbitrarily changes at least a portion of the encoding factors through a user interface.

14. A receiver (Rx) for remote control support, the receiver comprising:
a third reception unit for receiving, from a transmitter (Tx) connected to a source device, encoded data generated by encoding display screen data of the source device using a real-time communication protocol;
a decoder for decoding the encoded data received at the third reception unit; and
a mixer for performing mixing to provide the decoded data to a second display unit,
wherein at least one of a resolution, a codec type, a frame rate and a bit rate is used by an encoder of the transmitter for encoding factors of the display screen data, and
wherein an encoder of the transmitter arbitrarily changes at least a portion of the encoding factors through a user interface.

15. The receiver of claim 14, further comprising:
a control command input unit for receiving a control command for remotely controlling the source device through a user interface; and
a second transmission unit for transmitting the control command to the transmitter.

16. The receiver of claim 14, further comprising a third conversion unit for converting the decoded YUV data into RGB data.

17. The receiver of claim 14, managing a list of at least one connectable transmitter, and
selecting at least one of the at least one transmitter included in the list through a user interface and receiving display screen data from the selected transmitter.

18. An operation method of a receiver (Rx) for remote control support, the method comprising:
receiving, from a transmitter (Tx) connected to a source device, encoded data generated by encoding display screen data of the source device using a real-time communication protocol;
decoding the received encoded data received; and
performing mixing to provide the decoded data to a second display unit,
wherein at least one of a resolution, a codec type, a frame rate and a bit rate is used by an encoder of the transmitter for encoding factors of the display screen data, and
wherein the encoder of the transmitter arbitrarily changes at least a portion of the encoding factors through a user interface.

19. A system for remote control support, connected to a source device, the system comprising:
a transmitter (Tx) receiving display screen data of the source device, encoding the received display screen data, and transmitting the encoded data to a receiver using a real-time communication protocol; and
a receiver (Rx) receiving, from the transmitter, the encoded data using the real-time communication protocol, decoding the received encoded data, and performing mixing to provide the decoded data to a connected display unit,
wherein the transmitter is a hardware device wired to the source device through a digital interface, and
wherein the receiver and the transmitter are located at places distant from each other, wherein at least one of a resolution, a codec type, a frame rate and a bit rate is used by an encoder of the transmitter for encoding factors of the display screen data, and wherein an encoder of the transmitter arbitrarily changes at least a portion of the encoding factors through a user interface.

\* \* \* \* \*